United States Patent
Hayashi et al.

(10) Patent No.: US 9,771,980 B2
(45) Date of Patent: Sep. 26, 2017

(54) ROLLING BEARING RETAINER AND METHOD FOR MANUFACTURING SUCH RETAINER

(71) Applicant: NTN CORPORATION, Osaka (JP)

(72) Inventors: Tatsuya Hayashi, Kuwana (JP); Mitsuhiro Moriuchi, Kuwana (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/816,830

(22) Filed: Aug. 3, 2015

(65) Prior Publication Data
US 2015/0337901 A1  Nov. 26, 2015

Related U.S. Application Data

(63) Continuation of application No. PCT/JP2013/057386, filed on Mar. 15, 2013.

(30) Foreign Application Priority Data

Feb. 5, 2013  (JP) .................. 2013-020070

(51) Int. Cl.
*F16C 33/38* (2006.01)
*F16C 33/49* (2006.01)
(Continued)

(52) U.S. Cl.
CPC .... *F16C 33/3887* (2013.01); *B29C 45/14819* (2013.01); *B29C 45/1671* (2013.01);
(Continued)

(58) Field of Classification Search
CPC .... F16C 33/418; F16C 33/44; F16C 33/4611; F16C 33/4635; F16C 33/467; F16C 33/49;
(Continued)

(56) References Cited

U.S. PATENT DOCUMENTS 6,315,459 B1 * 11/2001 Takano .................. F16C 19/28
384/572
7,530,743 B2 * 5/2009 Yakura .................... F16C 19/28
384/470
(Continued)

FOREIGN PATENT DOCUMENTS

CN        202655566 U    1/2013
EP        1953400 A1 *   8/2008    .......... F16C 33/3812
(Continued)

OTHER PUBLICATIONS

International Search Report dated Apr. 9, 2013 in corresponding international application PCT/JP2013/057386.
(Continued)

*Primary Examiner* — Marcus Charles

(57) ABSTRACT

A rolling bearing retainer which is formed by insert molding a resinous material together with a core member within a mold, in which the core member is embedded within a resin part made of the resinous material and a support area exposure part is provided at a plurality of locations of the resin part for exposing a support area of the core member supported within a cavity of the mold. The resin part includes a ring shaped body and a plurality of support column bodies extending axially from the ring shaped body and defining a pocket for retaining a rolling element therebetween, and the core member is provided with a ring shaped body embedded part and a plurality of support column body embedded parts extending from the ring shaped body embedded part.

14 Claims, 11 Drawing Sheets

(51) Int. Cl.
| | |
|---|---|
| *F16C 33/56* | (2006.01) |
| *F16C 33/44* | (2006.01) |
| *B29C 45/14* | (2006.01) |
| *B29C 45/16* | (2006.01) |
| *B29C 45/26* | (2006.01) |
| *F16C 33/46* | (2006.01) |
| *F16C 33/41* | (2006.01) |
| *B29L 9/00* | (2006.01) |
| *B29L 31/04* | (2006.01) |
| *B29K 101/00* | (2006.01) |
| *B29K 105/20* | (2006.01) |

(52) U.S. Cl.
CPC ........ *F16C 33/3831* (2013.01); *F16C 33/418* (2013.01); *F16C 33/44* (2013.01); *F16C 33/467* (2013.01); *F16C 33/4611* (2013.01); *F16C 33/4635* (2013.01); *F16C 33/498* (2013.01); *F16C 33/56* (2013.01); *B29K 2101/00* (2013.01); *B29K 2105/20* (2013.01); *B29L 2009/005* (2013.01); *B29L 2031/04* (2013.01); *F16C 33/41* (2013.01); *F16C 33/49* (2013.01)

(58) Field of Classification Search
CPC ........ F16C 33/41; F16C 33/498; F16C 33/56; F16C 33/3831; F16C 33/3887; B29C 45/1671; B29C 45/14819; B29C 29/26; B29K 2101/00; B29K 2105/20; B29L 2009/005; B29L 2031/04; B21D 53/12
USPC ............... 384/527, 560, 572, 576–577, 614, 384/531.573; 264/279; 29/898.067
See application file for complete search history.

(56) References Cited

U.S. PATENT DOCUMENTS

| | | | |
|---|---|---|---|
| 8,104,968 B2 * | 1/2012 | Akamatsu | F16C 33/32 384/450 |
| 8,303,192 B2 | 11/2012 | Yamada et al. | |
| 2002/0001423 A1 * | 1/2002 | Tanimoto | C22C 38/18 384/492 |
| 2005/0023937 A1 * | 2/2005 | Sashida | B06B 1/0611 310/348 |
| 2008/0101735 A1 * | 5/2008 | Van De Sanden | F16C 33/60 384/445 |
| 2009/0220181 A1 | 9/2009 | Yamada et al. | |
| 2010/0202720 A1 * | 8/2010 | Kobayashi | B23Q 11/122 384/474 |
| 2011/0049868 A1 * | 3/2011 | Mori | F16B 2/10 285/188 |
| 2011/0274382 A1 * | 11/2011 | Berns | F16C 9/04 384/565 |

FOREIGN PATENT DOCUMENTS

| | | | | |
|---|---|---|---|---|
| JP | 08158441 A | * | 6/1996 | ............ E03C 1/264 |
| JP | 9-177794 | | 7/1997 | |
| JP | 10068420 A | * | 3/1998 | ............ F16C 33/416 |
| JP | 2002-130291 | | 5/2002 | |
| JP | 2002-339978 | | 11/2002 | |
| JP | 2002-357224 | | 12/2002 | |
| JP | 2003-120684 | | 4/2003 | |
| JP | 2004-019731 | | 1/2004 | |
| JP | 2005114098 A | * | 4/2005 | ............ F16C 33/416 |
| JP | 2006077801 A | * | 3/2006 | .......... F16C 33/4611 |
| JP | 2007-278418 | | 10/2007 | |
| JP | 2008-051206 | | 3/2008 | |
| JP | 2008-286319 | | 11/2008 | |
| JP | 2008-298105 | | 12/2008 | |
| JP | 2009014152 A | * | 1/2009 | ............ F16C 17/107 |
| JP | 2011-117609 | | 6/2011 | |
| JP | 2011112191 A | * | 6/2011 | |
| JP | 2011-161702 | | 8/2011 | |
| JP | 2011-206715 | | 9/2011 | |
| JP | 2011169370 A | * | 9/2011 | .......... F16C 33/3806 |

OTHER PUBLICATIONS

Japanese Office Action dated Nov. 25, 2014 in corresponding Japanese Application 2011-206715.
Japanese Office Action dated Aug. 4, 2015 in corresponding Japanese Patent Application No. 2011-206715.
PCT International Preliminary Report on Patentability dated Aug. 20, 2015 in corresponding International Patent Application No. PCT/JP2013/057386.
Taiwanese Office Action dated Oct. 3, 2016 in corresponding Taiwanese Patent Application No. 102109681.
Extended European Search Report dated Sep. 19, 2016 in corresponding European Patent Application No. 13874800.9.
Japanese Office Action dated Jan. 10, 2017 in corresponding Chinese Patent Application No. 2013-020070.
Japanese Notification of Reason(s) for Rejection dated Jun. 28, 2016 in corresponding Japanese Patent Application No. 2013-020070.
Chinese Office Action dated Apr. 19, 2017 from Chinese Patent Application No. 201380071467.9, 8 pages.
Chinese Office Action dated Dec. 2, 2016 in corresponding Chinese Patent Application No. 201380071467.9.
Japanese Office Action dated Jan. 10, 2017 in corresponding Japanese Patent Application No. 2013-020070.
Taiwanese Office Action dated Jan. 24, 2017 in corresponding Taiwanese Patent Application No. 102109681.

* cited by examiner

ROLLING BEARING RETAINER AND METHOD FOR MANUFACTURING SUCH RETAINER

CROSS REFERENCE TO THE RELATED APPLICATION

This application is a continuation application, under 35 U.S.C. §111(a), of international application No. PCT/JP2013/057386, filed Mar. 15, 2013, which claims priority to Japanese patent application No. 2013-020070, filed Feb. 5, 2013, the entire disclosure of which is herein incorporated by reference as a part of this application.

BACKGROUND OF THE INVENTION

Field of the Invention

The present invention relates to a retainer used in a rolling bearing and a method of manufacturing such retainer and, more particularly, to the technology of making such retainer by means of an insert molding of a core member with resinous material.

Description of Related Art

As a resin made retainer used in the bearing, that which is formed by the use of an insert molding applied to the resinous material and that which is formed by the insert molding of the resinous material together with an insert member in the form of, for example, an iron plate are available. (In this connection, reference is made to the patent documents 1 and 2 listed below.) Of them the retainer shown in FIG. 20 of the accompanying drawings is a resin made, crown shaped retainer (also referred to as "resin made snap cage") in which an insert member 51 is provided at a bottom face 50 on the rear side of pockets Pt. On the other hand, the retainer shown in FIG. 21 of the accompanying drawings is a crown shaped retainer having its side face provided with an insert member 52.

Also, even in the bearing for use with the precision machinery, a plurality of cylindrical rollers having a relatively uniform outer diametric dimension have hitherto been assembled into a single row or multi-row cylindrical roller bearing and the use is made therein of a retainer for retaining those cylindrical rollers in equally circumferentially spaced relation to each other. (In this respect, see the patent document 3 listed below.) The retainer largely employed in the multi-low cylindrical roller bearing is in the form of a resin made retainer. For a high speed rotation use, the use of a material having a high rigidity, such as, for example, a polyether ether ketone resin (PEEK) or a polyphenylene sulfide resin (PPS) is often made so that the retainer can withstand the centrifugal force acting thereon.

PRIOR ART LITERATURE

[Patent Document 1] JP Laid-open Patent Publication No. 2003-120684
[Patent Document 2] JP Laid-open Patent Publication No. 2007-278418
[Patent Document 3] JP Laid-open Patent Publication No. 2002-357224

The previously described resin made retainer in which only the resinous material has been insert molded has been found having the following problems:

Surface sinks tend to occur in the surface of a molded product and, therefore, it is hard to render the dimensional accuracy of the retainer to be accomplished highly accurately.

During the molding, a weld line appears between an insert resin and an injected resin and, therefore, insufficient strength often occurs.

With the resin made retainer shown in FIGS. 20 and 21, during the insert molding, the insert members 51 and 52 have to be supported within the cavity defined in a mold. For this reason, the insert members 51 and 52 are unable to be embedded in the resin part and support surfaces 51a and 52a are provided in the retainer bottom surface or a side surface so that they may be exposed to the retainer surface. Where the insert members 51 and 52 are provided only in respective such surface parts of the retainer as the retainer bottom surface and the side surface, during the use of the bearing there is a high possibility that, due to the difference in coefficient of linear expansion between the resinous material and the insert member (iron plate), an insufficient bond strength with the resin is likely to occur to such an extent as to result in, for example, separation of the insert member from the resin at the time of a high temperature and/or separation of the insert member from the resin under the influence of vibrations.

Also, with the conventional insert technique, only the crown shaped retainer, in which the pockets are formed in one side face of an annular body, could have been molded. For example, when a ladder shaped retainer is to be insert molded, not only is formation of the pockets difficult to achieve, but also the shape of the insert member becomes complicated.

Furthermore, as discussed above, although the retainer is required to have a capability of withstanding the centrifugal force acting thereon under the high speed rotation, the retainer, when the retainer material is employed in the form of a resin, is apt to accompany deformation under the influence of the centrifugal force.

In view of the above, in order to enable it to be satisfactorily used under the high speed rotation, a specification to increase the rigidity is needed so that toric parts and column parts of the retainer will not considerably deform. In order to increase the rigidity of the retainer, the need is recognized (1) to increase the wall thickness of various parts and/or (2) to select a material having a high Young's modulus.

It has, however, been found that in the case of the former (I) above, it is difficult to secure a wall thickness of the various parts within the limited space available within the bearing and since, even in the case of the latter (2) above, the material is limited to such material having a relatively high strength as PEEK or PPS referred to previously, a considerable increase of the cost of the material itself is incurred.

While in the case of the bearing for use in precision machinery the mutual error in roller diameter in one bearing is controlled on the high level, the mutual error in roller diameter cannot be zeroed even though it is increased so much. By way of example, in the case of the main shaft used in the machine tool, in order to increase the radial rigidity of the bearing, the bearing radial internal gap subsequent to set-in a device is generally set to a preloaded side gap (minus side gap). At this time, a slight difference in outer diametric dimension of the roller diameter results in the difference in orbital speed and, hence, lead-lag is induced between the rollers on the circumference. By way of example, the controlled value of the mutual error in roller diameter is set up uniquely by a manufacturer, but since measurement and analysis of an extra high precision bearing produced by our company or available on the market have revealed that the accuracy in non-repeated run-out tolerance is within the range of 0.22 to 1.0 µm, the mutual error in roller diameter is controlled to the range of values smaller than that referred to above.

SUMMARY OF THE INVENTION

In view of the foregoing, an object of the present invention is to provide a rolling bearing retainer and a method of making such retainer, which are aimed at increasing the dimensional accuracy of the retainer and also at improving the strength insufficiency and which are designed to increase the adhesion of retainer forming members and are capable of being applied to various retainer shapes. Another object of the present invention is to provide a rolling bearing of a kind in which the cost of material can be reduced, the rigidity of the retainer can be increased to the extent equal to or higher than a high level resin made product and the lead-lag of the rolling elements can be alleviated.

In order to accomplish the foregoing objects of the present invention, there is, in accordance with the present invention, provided a rolling bearing retainer which is formed by insert molding a resinous material together with a core member with the use of a mold. The core member used in this rolling bearing retainer is embedded within a resin part made of the resinous material and there is provided a support area exposure part at a plurality of locations of the resin part for exposing a support area of the core member supported within a cavity of the mold.

According to the above described construction, since the core member is embedded in the resin part, as compared with the structure in which the core member is provided in a resin part surface, not only is the strength of the retainer in its entirety increased, but also the adhesion between the resin part and the core member can be increased. For this reason, during the use of the bearing, even though the bonding strength between a surface of the core member and the resin part, for example, is reduced as a result of the temperature rise and/or vibrations of the retainer, the other surface of the core member is supported with the resin part held in adhesion thereto. Accordingly, there is no possibility that the core member is undesirably peeled off from the resin part. While the core member is embedded within the resin part, since the plurality of support area exposure parts is provided in the resin part, the core member can be stably supported within a cavity and the insert molding can be accomplished. Also, the proportion of the resinous material occupied within the retainer as a whole can be reduced as compared with the retainer made solely of the resinous material. In view of this, the occurrence of surface sinks, which is inconveniences peculiar to the resin, can be reduced and the dimensional accuracy can be accomplished highly accurately. Also, because of the structure in which the core member is embedded within the resin part and the support area exposure parts are provided, unlike the structure in which the core member is provided in the retainer surface, it can accommodate a variety of retainer shapes.

The resin part referred to above may include a ring shaped body and a plurality of support column bodies extending axially from the ring shaped body and defining a pocket for retaining a rolling element therebetween, and the core member is provided with a ring shaped body embedded part embedded in the ring shaped body of the resin part and a plurality of support column body embedded parts extending from the ring shaped body embedded part and embedded in the respective support column bodies. As described above, with the core member embedded over the ring shaped body and each of the support column bodies in the resin part, the entire skeleton including the ring shaped body and the support column bodies is formed by the core member. Accordingly, as compared with the conventional retainer in which the insert member is provided in a rear side or a bottom side of the pocket, the rigidity can be increased.

The core member referred to above may be a press worked product of a metallic plate. In this case, a desired core member shape can be formed by applying to a metallic plate such a press work as, for example, blanking work, bending work or molding work.

Each of the support column body embedded parts may be in the form of a bent piece bend at a base end relative to the ring shaped body embedded part.

In those cases, as compared with a process such as, for example, a cutting work being applied to the core member, the number of processing steps can be reduced to enable the manufacture at an inexpensive cost.

The support area of the core member may be in the form of a recess formed in an axial outer surface on one side of the ring shaped body embedded part, in which the support column body embedded part does not protrude. In this case, with no specifically dedicated component part added, the mere formation of the recess makes is possible to simply support the core member within the cavity of a mold.

The rolling bearing retainer referred to above may be formed as a ladder shaped type by means of a pair of the ring shaped bodies, which confront with each other while axially spaced from each other, and a plurality of the support column bodies that respectively connect the pair of the ring shaped bodies.

Alternatively, the rolling bearing retainer referred to above may be formed as a crown shaped type by means of a single ring shaped body and a plurality of the support column bodies extending axially from one side face of the ring shaped body and defining the round pocket for retaining a ball, which is the rolling element, therebetween.

Yet alternatively, the rolling bearing retainer may be formed as a comb shaped by means of a single ring shaped body and a plurality of the support column bodies extending axially from one side face of the ring shaped body and defining the pocket for retaining a roller, which is the rolling element, therebetween.

In the rolling bearing retainer as the ladder shaped type referred to above, a pair of core member split bodies may be opposed axially to each other to form the core member, in which case each of those core member split bodies includes the ring shaped body embedded part and the plurality of support column body embedded parts extending axially from the ring shaped body embedded part. In this case, the ring shaped body embedded part in each of the core split bodies can be insert molded while supported by one and the other of the molds that are combined together.

The pair of the core member split bodies may be of the same shape and arranged to confront in respective directions opposite to each other. In this case, the pair of the core member split bodies can be rendered to be commonly utilizable component parts of the same shape and, therefore, the manufacturing cost can further be reduced.

The mold referred to above may include a stationary mold and a movable mold provided for moment between a mold open condition and a mold closed condition relative to the stationary mold, in which case one or both of the stationary mold and the movable mold is/are provided with support projections protruding into the cavity for supporting the support areas of the core member. With the movable mold separated from the stationary mold to the mold open condition, the support projections protruding into the cavity are caused to support the support areas of the core member. Subsequently, the movable mold is moved to the mold closed condition and the resinous material is then filled into and hardened within the cavity, thereby molding the retainer.

The present invention also provides the rolling bearing which utilizes any of the retainers of the type hereinabove discussed.

In the rolling bearing according to the present invention, the rolling bearing may include a plurality of the rolling elements retained by the retainer, which rolling elements are interposed between an inner ring and an outer ring and the mutual error of the rolling element diameter is not greater than 2 µm.

The term "mutual error of a rolling element diameter" referred to hereinbefore and hereinafter is to be understood as meaning the difference between the maximum value and the minimum value of the average rolling element diameters of the plurality of the rolling elements provided in a single rolling bearing.

The resin made retainer is generally largely utilized because it is excellent in that deterioration of the lubricant is low as compared with any other metal made retainers, but has a demerit in that as compared with the metal made retainer, the strength and the rigidity are low.

Also, although the resin made retainer is generally formed by means of an injection molding technique, molding shrinkage during the molding takes place largely and the accuracy is difficult to secure as compared with any other retainers that mechanically processed and, hence, it is quite often that a large pocket gap and a large guide gap are secured in anticipation of the extent of deviation in accuracy. As a result thereof, the amount of run-out of the retainer tends to become large and, hence, the vibration and the level of the acoustic value often tend to increase.

However, according to the structure designed in accordance with the present invention, the retainer includes the ring shaped core member and the resin part enclosing the core member. The use of the core member extraordinarily high in Young's modulus as compared with the resin makes it possible to use a relatively inexpensive resinous material as compared with PEEK and PPS and, yet, the retainer rigidity comparable or higher than that exhibited by the use of for example, PEEK can be obtained.

Although it may generally be considered that complexation of the resin and the metallic body will result in increase of the cost, an attempt to increase the retainer rigidity with the use of only the resin does not often lead to become successful unless the expensive resinous material is selected. However only the use of the relatively inexpensive material for the core member in combination with the resinous material will not necessarily leads to the increase of the cost so much as the retainer made of only the expensive resinous material, when considering comprehensively.

With the retainer rigidity so increased as hereinabove discussed, even though the mutual error of the rolling element diameter is chosen to be not greater than 2 µm, lead-lag of the rolling elements can be finely corrected. Accordingly, since when the rolling element is to be manufactured, the productivity increases in terms of the processing, the cost of manufacture can be reduced much more than the conventional technique. The retainer designed according to the present invention can work satisfactory when used particularly in the application at a preload gap (in which the radial internal gap is a minus value) and the lead-lag can be finely corrected by increasing the retainer rigidity, but even where the radial inner gap is a positive gap, the increase of the retainer rigidity is effective to allow the lead-lag of the rolling elements to be finely corrected within a load range.

Also, by increasing the retainer rigidity, reduction of the bending strength applied to the retainer can be accomplished. Accordingly, the circumferential thickness of the support column body in the retainer can be reduced and, hence, the number of the rollers that can be accommodated by the retainer can be increased to a value greater than that in the conventional retainer. Accordingly, the radial rigidity of the bearing can also be increased.

The core member includes a ring shaped body embedded part, which is embedded in the ring shaped body of the resin part, and a plurality of support column body embedded parts extending from the ring shaped body embedded part and embedded in the respective support column bodies. In other words, when the support column body embedded parts are so shaped as to be continued from the ring shaped body embedded part of a ring shape so as to protrude axially, the rigidity of the ring shaped body embedded part can be increased and, also, the rigidity of the support column body embedded parts having formed therein the pockets for guiding outer diametric surfaces of the rolling elements can be increased. In view of this, for a given number of the rolling elements, the strength of the support column bodies used in the retainer can be increased.

The provision of the core member, made of, for example, the metallic material, within the resin part is particularly advantageous enough to make it less sensitive to influences brought about by shrinkage during the molding and the retainer can be highly accurately formed as compared with the ordinary retainer made of only a resinous material. As a result thereof, the necessity of increasing pocket gaps and guide gaps in the retainer is eliminated and, hence, the amount of run-out of the retainer can be reduced as compared with that exhibited by the conventional retainer. In view of this, not only can the vibration resulting from run-out of the retainer be reduced, but also the level of an acoustic value can be reduced.

The resin part referred to above may be made of the resinous material having a Young's modulus not higher than 9 GPa. As a material used for the resin part, such material having the Young's modulus not higher than 9 GPa as, fir example, polyamide resins (PA66, PA46, PA6) can be used. In such case, the cost of material can be reduced as compared with the use of such resinous material as, for example, PEEK and PPS.

At least one of the inner ring, the outer ring and the plurality of the rolling elements may be made of a ceramic material.

The circularity of the rolling element may be not greater than 1 µm.

The present invention furthermore provides a method of making the rolling bearing retainer having any one of the structures hereinabove discussed. Specifically, there is provided a method of making a rolling bearing retainer formed by insert molding a resinous material together with a core member with the use of a mold. This rolling bearing retainer making method includes the steps of providing a support projection, which projects into a cavity of the mold to support the core member, at a plurality of circumferential locations of the mold; and, filing and hardening the resinous material into and within the cavity of the mold to embed the entire core member, excluding a support area of the core member supported by the support projection, into a resin part made of the resinous material to thereby provide a support area exposure part, at which the support area is exposed, in the resin part.

According to the retainer making method of the present invention discussed above, the entire core member excluding the support areas of the core member are embedded within the resin part and, therefore, as compared with the structure in which the core member is provided in a resin part surface, not only can the strength of the retainer in its entirety be increased, but the adhesion between the core part and the core member can also be increased. While the core member is embedded in the resin part, the plurality of the support area exposure parts is provided in the resin part to allow the core member to be stably supported within a cavity and the insert molding can be accomplished. Also, the proportion of the resinous material occupied in the entire retainer can be reduced as compared with that in the retainer made solely of the resinous material. In view of the above, the occurrence of the surface sinks, which is an inconvenience peculiar to the resin, can be reduced and the dimensional accuracy can be accomplished highly accurately. Also, since the core member is embedded in the resin part and the support area exposure parts are provided in such resin part, a variety of retainer shapes can be accommodated unlike the case in which the core member is provided in the retainer surface.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
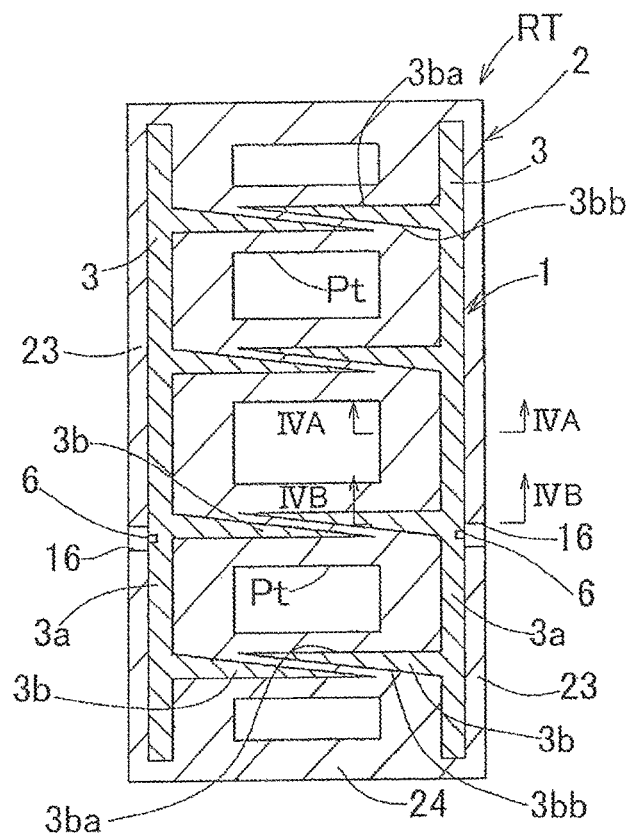
FIG. 1 is a sectional view showing a rolling bearing retainer designed in accordance with a preferred embodiment of the present invention.

A rolling bearing retainer designed according to a first preferred embodiment of the present invention will now be described in detail with particular reference to FIGS. 1 to 8. It is to be noted that the following description is to be understood as connoting a description of a method of making the rolling bearing retainer. The retainer RT designed according to this preferred embodiment is a retainer used in a single row cylindrical roller bearing, selected from radial bearings, and is used to rotatably retain rollers, forming a plurality of rolling elements, in circumferentially equally spaced relation to each other. This retainer RT is in the form of a so-called ladder type retainer as shown in FIG. 1, in which a resinous material and a core member are insert molded within a mold (as will be described later), and is therefore made up of a core member 1 and a resin part 2 comprised of the resinous material. The core member 1 has support areas 6 that are supported within the cavity of the mold and the core member in its entirety, excluding the support areas 6, is embedded within the resin part 2. The resin part 2 is made up of a pair of ring shaped bodies 23 and a plurality of support column bodies 24. At a plurality of sites of each of the ring shaped bodies 23 in the resin part 2, a support area exposure part 16 as will be described later is provided. Each of the plural support column bodies 24 extends from the ring shaped bodies 23 in an axial direction and, as shown in FIG. 2, a pocket Pt for supporting the respective rolling element T is defined between the neighboring support column bodies 24.

Figure 3A:
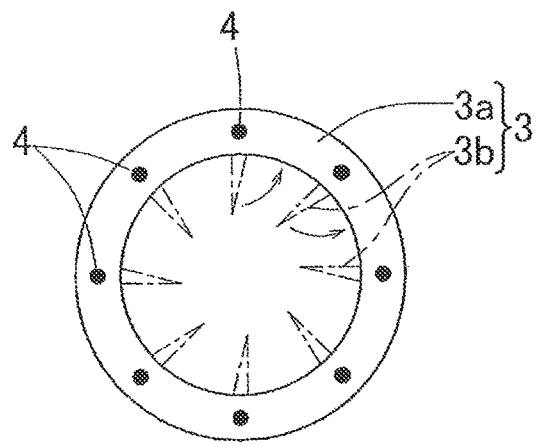
FIG. 3A is a side view showing a core member, used in the rolling bearing retainer, as viewed from one side of the axial direction.
Figure 3B:
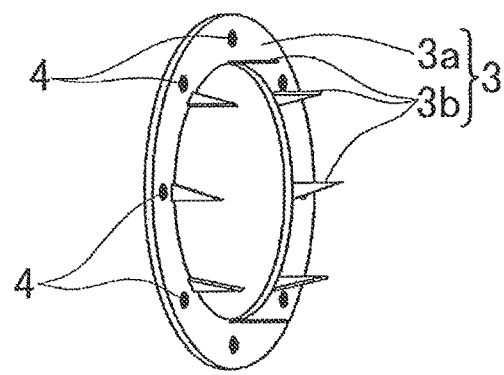
FIG. 3B is a perspective view schematically showing the core member.

As shown in FIG. 1, the core member 1 is of a type comprised of a pair of core member split bodies 3 and 3 that are combined together so as to oppose to each other, and those core member split bodies 3 and 3 are so formed as to form a skeleton within the retainer. As shown in FIGS. 3A and 3B, each of the core member split bodies 3 and 3 is in the form of a metallic plate by the use of a press work, and, those core member split bodies 3 and 3 are so formed as to have an identical shape and are then disposed in face to face relation so as to be oriented in respective directions opposite to each other. As the metallic plate, a cold rolled steel plate, for example, can, be used. Each of those core member split bodies 3 and 3 has a surface roughness so chosen as to be within the range of 1 S and 5 S. Each of those core member split bodies 3 and 3 is made up of a ring-shaped body embedded part 3a (i.e., a part 3a that is embedded within the corresponding ring shaped body 23) of a plate like shape and a plurality of support column body embedded parts 3b (i.e., parts that are embedded within the respective support column bodies 24). The support column body embedded parts 3b extend from one of the ring shaped body embedded parts 3a in a direction axially towards the other of the ring shaped body embedded parts 3a while being arranged having been spaced an equal distance circumferentially from each other. The ring shaped body embedded parts 3a are embedded within the respective ring shaped bodies 23 in the resin part 2 whereas the support column body embedded parts 3b are embedded within the respective support column bodies 24 in the resin part 2. Each of the support column body embedded part 3b is in the form of a bent piece so processed as to bend at a base end relative to the ring shaped body embedded parts 3a.

The support column body embedded parts 3b, when and so long as they are not yet bent in the axial direction, assume such a shape as shown by the single dotted lines in FIG. 3A, but when so bent in the axial direction, those support column body embedded parts 3b assume such a shape as shown by the solid lines in FIG. 3B. When each of the support column body embedded parts 3b is pressed and bent subsequent to the press and blanking work having been so applied as to allow it to assume such shape as shown in FIG. 3A, the core member of a desired shape as shown in FIG. 3B can be shaped.

Figure 2:
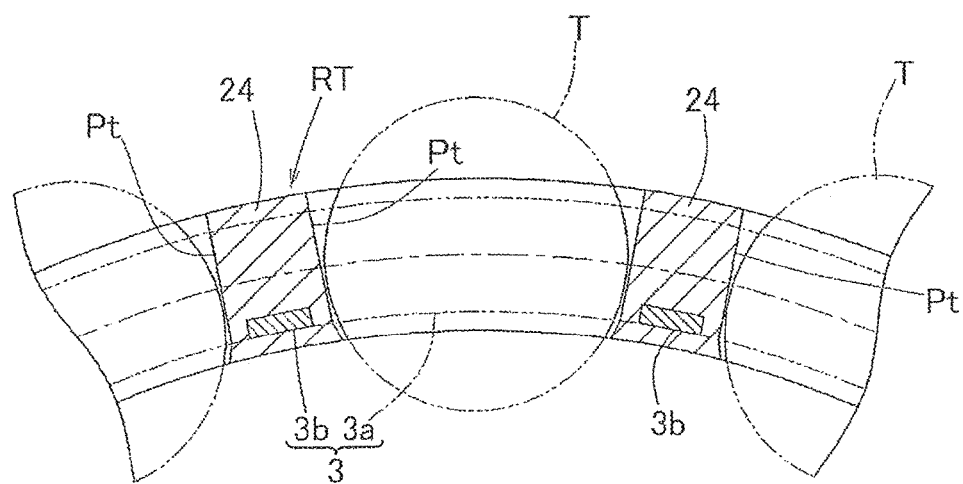
FIG. 2 is a side view, with a portion cut out, showing the rolling bearing retainer as viewed from an axial direction.

Each of the support column body embedded parts 3b referred to above has a column width smaller than that of each of the support column bodies 24 as shown in FIG. 2 and is defined to have a widthwise dimension determined in a circumferential direction. It is, however, to be noted that the support column body embedded part 3b in this example is so shaped as to represent a tapered shape with the above mentioned widthwise dimension tapering progressively from a base end part, which is continued to an inner diametric side edge part of the ring shaped body embedded part 3a, towards a ring shaped body side that is opposed thereto.

As shown in FIG. 1, in each of the support column body embedded parts 3b, a first side 3ba is so formed as to be parallel to the axial direction and a second side 3bb opposite to the first side 3ba is similarly so formed as to be slantwise relative to the axial direction. The slantwise side 3bb of the support column body embedded part 3b, which is continued to one of the ring shaped body embedded parts 3a, and the slantwise side 3bb of the support column body embedded part 3b, which is continued to the other of the ring shaped body embedded parts 3a are so disposed as to adjoin with each other with a predetermined circumferential gap intervening circumferentially therebetween. As discussed above, the pluralities of the support column body embedded parts 3b in the pair of the core member split bodies 3 and 3 are combined together alternately in a phase displaced a slight angle from each other and are spacedly disposed relative to each other over a region ranging from an intermediate portion of each of the support column body embedded parts 3b towards a tip end portion thereof.

As shown in FIG. 3A, the ring shaped body embedded part 3a of each of the core member split bodies 3 is formed with a plurality of, for example, eight in the illustrated instance, holes 4 which are spaced circumferentially equally at a predetermined distance from each other to allow a resinous material to flow rearwards and frontwards. Each of those holes 4 is in the form of a round hole of a diameter within the range of 0.5 to 5.0 mm and is formed in a radially intermediate portion in the ring shaped body embedded part 3a. It is, however, to be noted that each of those holes 4 may not be limited to have the above described diametrical dimension.

Figure 4A:
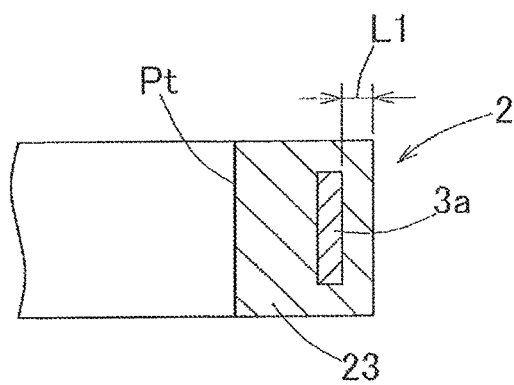
FIG. 4A is a cross sectional view taken along the line IVA-IVA in FIG. 1.
Figure 4B:
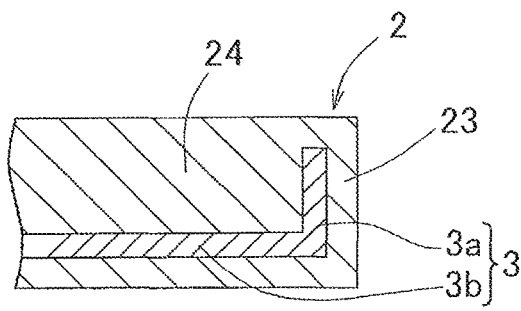
FIG. 4B is a cross sectional view taken along the line IVB-IVB in FIG. 1.

FIG. 4A is a cross sectional view taken along the line IVA-IVA in FIG. 1 and FIG. 4B is a cross sectional view taken along the line IVB-IVB in FIG. 1. As shown in FIGS. 4A and 4B, with the core member having been embedded in the resin part 2, formation is made to render the core member 1 to form the skeleton within the retainer. On the other hand, the distance L1 from an outer side surface of one of the ring shaped body embedded parts 3a to an outer side surface of the ring shaped body 23 that covers such one of the ring shaped body embedded parts 3a and the distance L1 from an outer side surface of the other of the ring shaped body embedded parts 3a to an outer side surface of the ring shaped body 23 that covers such other of the ring shaped body embedded parts 3a are so controlled as to have the same dimension. Also as shown in FIG. 4B, the ring shaped body embedded part 3a and the support column body embedded part 3b are formed by bending the core member 1 so as to have an L-shaped section.

Figure 5:
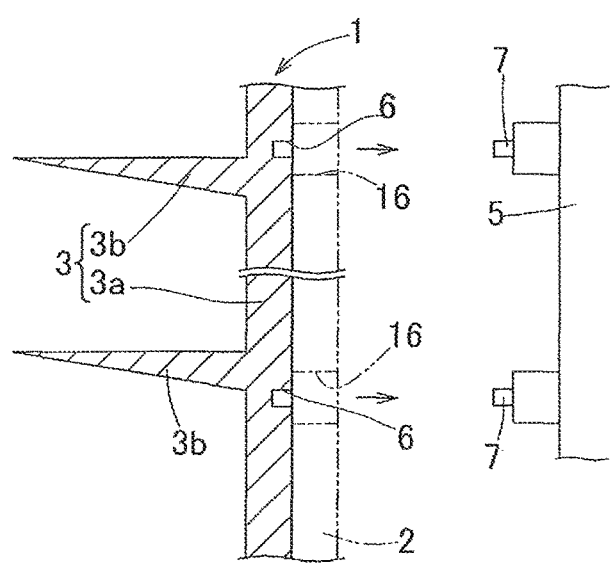
FIG. 5 is an enlarged sectional view showing an important portion of the rolling bearing retainer.

As shown in FIG. 5, the outer side surface of the ring shaped body embedded part 3a in the core member split body 3 is provided with a plurality of support areas 6 which are circumferentially spaced an equal distance from each other for supporting the core member 1 within the cavity of the mold 5. Each of the support areas 6 is in the form of a recessed part formed in an axial outer side surface on the side where the support column body embedded part 3b is not protruded. The recessed part referred to above is in the form of a non-throughhole in the instance shown and, when the support area 6 of the ring shaped body embedded part 3a is engaged with a support projection 7 provided on the mold by interference fit, each of the core member split bodies 3 is positioned relative to and supported by the mold 5. In the resin part 6, the support area exposure part 16 referred to previously, through which the support area 6 is exposed, is provided at a plurality of circumferential sites corresponding to each of the support areas 6. It is, however, to be noted that the support areas 6 provided in one of the ring shaped body embedded parts 3a and the support areas 6 provided in the other of the ring shaped body embedded parts 3a are equal in number and provided in phase matched relation to each other. It is also to be noted that the support areas 6 may be provided in circumferentially equally spaced relation at three or more locations. Yet, the plurality of the support areas 6 can be disposed in a circumferentially non-equally spaced relation to each other and the recessed part referred to above may be in the form of a throughhole.

Figure 6:
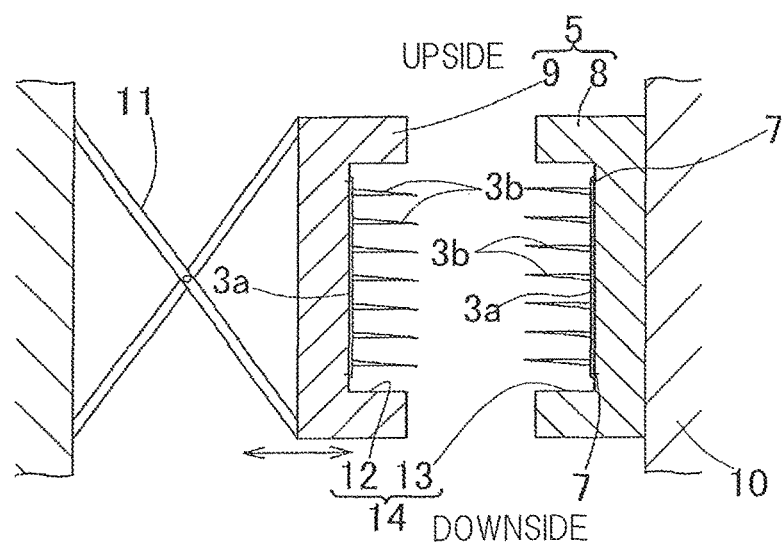
FIG. 6 is a diagram showing a supporting step in which the core member of the rolling bearing retainer is supported in a mold.
Figure 8:
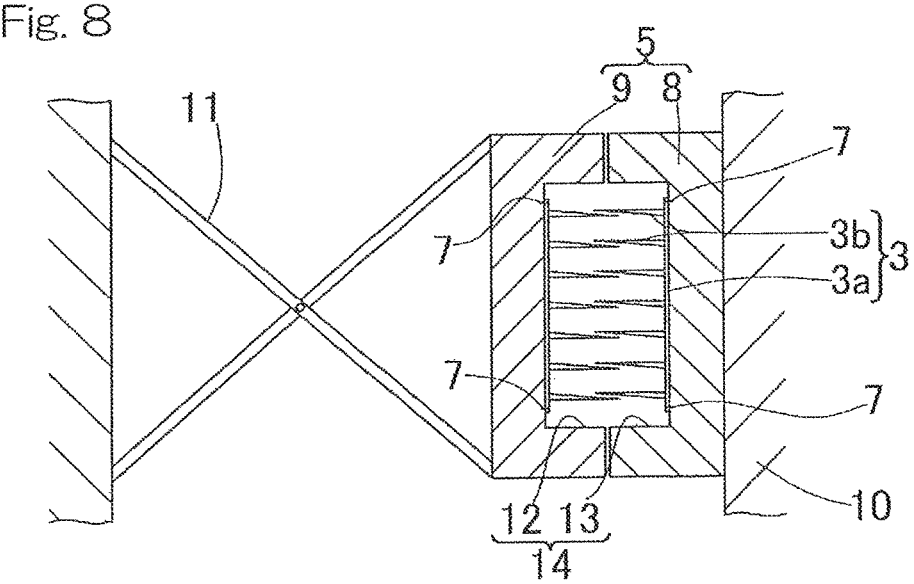
FIG. 8 is a diagram showing a covering step in which a resinous material is filled in a cavity in the mold.

As shown in FIG. 6, the mold 5 is made up of a stationary mold 8 and a movable mold 9 that are combined together. The stationary mold 8 is fixed by, for example, a frame 10 while the movable mold 9 has a pantograph shaped drive mechanism 11 fitted thereto. A cavity part 12 of the movable die 9 and a cavity part 13 of the stationary mold 8 are disposed in opposed relation to each other. Those cavity parts 12 and 13 when in a combined state, form the cavity 14. The movable mold 9 is so constructed as to be movable between a mold open condition, as shown in FIG. 6, and a mold closed condition, as shown in FIG. 8, by means of the drive mechanism 11.

Figure 7:
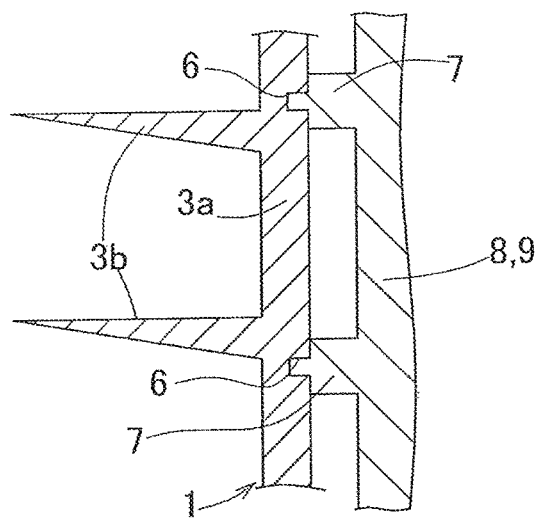
FIG. 7 is an enlarged sectional view showing, on an enlarged scale, a support side of the core member.

When the mold 5 is in the mold open condition shown in FIG. 6, as shown in FIG. 7, the support areas 6 in one of the core member split bodies 3 are engaged with the support projections 7 protruding into the cavity part 13 of the stationary mold 8 and the support areas 6 of the other of the core member split bodies 3 are engaged with the support projections 7 protruding into the cavity part 12 of the movable mold 9. Thereafter, the movable mold 9 is moved and, when it is in the mold closed condition as shown in FIG. 8, the resinous material is filled into and hardened within the cavity 14. During the molding with the use of this mold. 5, the pockets Pt for the rolling elements are also formed. A gate (not shown) for filling the resinous material within the cavity 14 is provided in the stationary mold 8. It is to be noted that the pockets Pt may be formed by processing after the removal of a molded product out of the mold 5.

According to the rolling bearing retainer RT of the type hereinbefore discussed, the core member 1 is embedded in the resin part 2 and, therefore, as compared with the structure in which the core member is provided on a resin part surface, not only can the strength of the retainer as a whole be increased, but the adhesion between the resin part 2 and the core member 1 can also be increased. For this reason, during the use of the bearing, even though the bonding strength between one surfaced of the core member 1 and the resin part 2, for example, is reduced as a result of the temperature rise and/or vibrations of the retainer RT, the other surface of the core part 1 is supported by adhesion to the resin part 2. Accordingly, there is no possibility that the core member 1 may be undesirably stripped off from the resin part 2.

Although the core member 1 is embedded within the resin part 2, the provision of the plurality of the support area exposure parts in the resin part 2 is effective to allow the core member 1 to be stably supported within the cavity 14 and, hence, the insert molding is carried out satisfactorily. Also, the proportion of the resinous material occupied in the retainer as a whole can be reduced as compared with the retainer made solely of the resinous material. Accordingly, occurrence of for example, the surface sinks, which is an inconvenience peculiar to the resin, can be reduced to allow the dimensional accuracy to be highly accurately increased. Also, since the structure is such that the core member 1 is embedded within the resin part 2 and the support area exposure parts 16 are provided in the resin part 2, unlike the case in which the core member is provided on the retainer surface, it is possible to accommodate application to various retainer shapes. Also, since not only is the core member in its entirety be embedded within the rein part 2, but also the support areas 6 for the core member 1 are provided in circumferentially equally spaced relation to each other, the run-out tolerance during the rotation can be accommodated within the stipulated value without allowing the center of gravity of the retainer RT to displace from the desired position. Accordingly, as compared with the conventional technology, the retainer lifetime can be increased.

Since the core member 1 is prepared from the metallic plate by means of the press work and the support column body embedded parts 3b are each in the form of the bent piece formed by bending the base end thereof relative to the ring shaped body embedded parts 3, it can be manufactured inexpensively, as compared with that the preparation of the core member by the use of for example, a cutting process, while the number of processing steps is reduced. Since the pair of the core member spit bodies 3 and 3 are combined while having been axially opposed, the pair of the core member split bodies 3 and 3 can be rendered to be commonly utilizable component parts of the same shape and, therefore, the manufacturing cost can further be reduced.

Since the support column body embedded part 3b of the core member 1 is so shaped as to taper progressively from the base end part, which is continued to the inner diametric side edge part of the ring shaped body embedded part 3a, towards the ring shaped body side that is opposed thereto, the rigidity of the base end of the support column body embedded part 3b is increased as compared with that of the tip end part and, hence, the strength of the core member as a whole can be increased.

Where the hole 4 for causing the resinous material to fluidize is provided in the ring shaped body embedded part 3a of the core member 1, when the retainer RT is to be formed in the mold 5 by means of the insert molding, the resinous material fluidizes through the hole 4 in the ring shaped body embedded part 3a. Accordingly, the fluidity of the resinous material increases and the occurrence of any inconveniences such as, for example, air gaps in the resin part 2 can be prevented before they happen. In view of this, reduction of, for example, surface sinks occurring in the resin part surface is further reduced and the dimensional accuracy can become highly accurate. With the inconveniences occurring in the resin part having been prevented, the yield can be increased and the productivity can also be increased. Also, since a portion of the resin part 2 creeps into the hole 4 in the ring shaped body embedded part 3a, the adhesion between the core member 1 and the resin part 2 can be increased. In addition, since the surface roughness of the core member has been so chosen as to be within the range of 1 to 5 S, the bonding strength between the core member 1 and the resin part 2 and the adhesion between the both can be increased.

Other preferred embodiments of the present invention will be discussed hereinafter.

It is, however, to be noted that in the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments.

Figure 9:
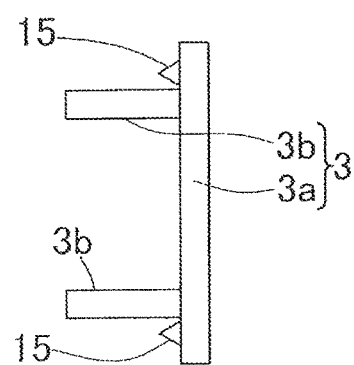
FIG. 9 is a diagram showing the core member of the rolling bearing retainer designed in accordance with a second preferred embodiment of the present invention.

As is the case with the second preferred embodiment of the present invention shown in FIG. 9, in the ring shaped body embedded part 3a of the core member split body 3, a plurality of projections 15 protruding axially may be provided in an inner side surface in which the support column body embedded part 3b extends. Each of the projections 15 is formed to a conical shape tapering towards a tip end side.

In such case, the bonding strength between the core member 1 and the resin part 2 and the adhesion of the both can further be increased.

Figure 10:
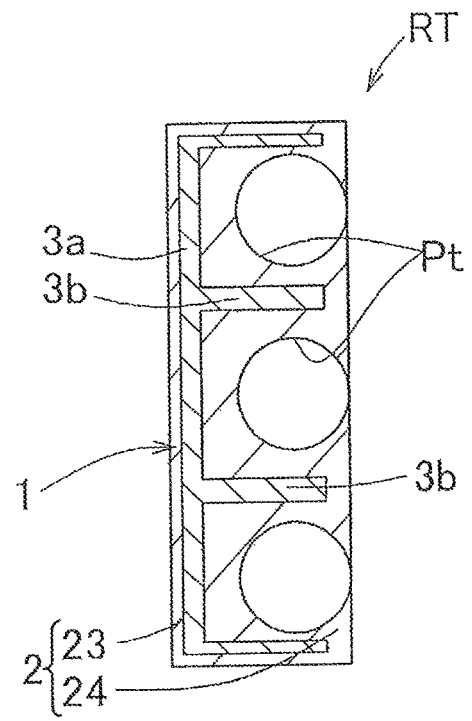
FIG. 10 is a sectional view showing the rolling bearing retainer designed in accordance with a third preferred embodiment of the present invention.

As is the case with the third preferred embodiment of the present invention shown in FIG. 10, the present invention may be applied to a crown type ball bearing retainer. The crown type retainer RT shown in FIG. 10 is constituted by a core member 1 as a single item, not the core member made up of the core member split bodies, and the resin part 2 covering the entire core member except for the support areas 6 (shown in and discussed with reference to FIG. 5) within the cavity. Also, in the retainer in this example, the pockets Pt for retaining the rolling elements are formed during the molding taking place with the use of the mold.

Figure 11:
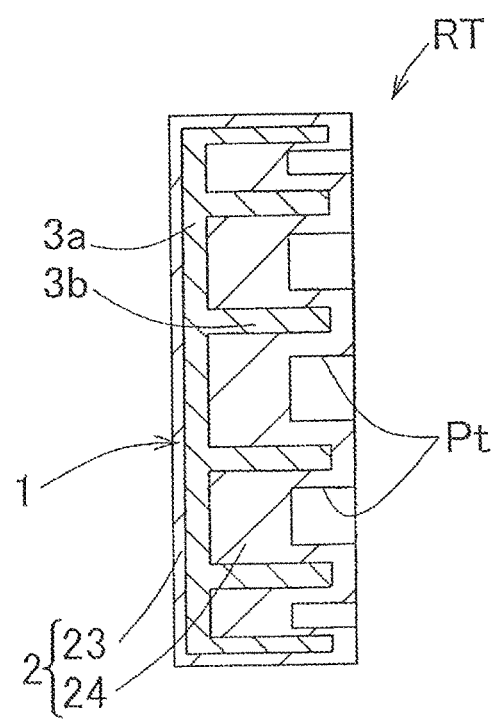
FIG. 11 is a sectional view showing the rolling bearing retainer designed in accordance with a fourth preferred embodiment of the present invention.

As is the case with the fourth preferred embodiment of the present invention as shown in FIG. 11, the present invention may be applied to a comb shaped type roller bearing retainer. Even this comb shaped type roller bearing retainer RT includes the core member 1 as a single item, not the core member made up of the core member split bodies, and the resin part 2 covering the entire core member except for the support areas 6 (shown in and discussed with reference to FIG. 5) within the cavity and the pockets Pt for retaining the rolling elements are formed during the molding taking place with the use of the mold.

According to any of those retainers RT, since the core member in its entirety, except for the support areas 6, is covered by the resin part 2, the proportion of the resinous material occupied in the retainer in its entirety can be reduced as compared with that in the retainer made up solely of a resinous material. Accordingly, the occurrence of, for example, surface sinks can be reduced and it becomes possible to increase the dimensional accuracy highly accurately. Also, with the core member in its entirety covered by the resin part 2, not only can the strength insufficiency be improved, but the adhesion between the resin part 2 and the core member 1 can also be increased.

Although in any one of the first to fourth preferred embodiments of the present invention discussed hereinabove, as the recessed part forming each of the support areas 6, a recessed part is engaged with the support projection 7 of the mold, but in place of the structure referred to above, each of the support area 6 may be rendered as a projecting part that projects axially outwardly and this projecting part may be engaged in the recessed part within the cavity of the mold.

The fifth preferred embodiment of the present invention will now be described with particular reference to FIGS. 12 to 17.

Figure 12:
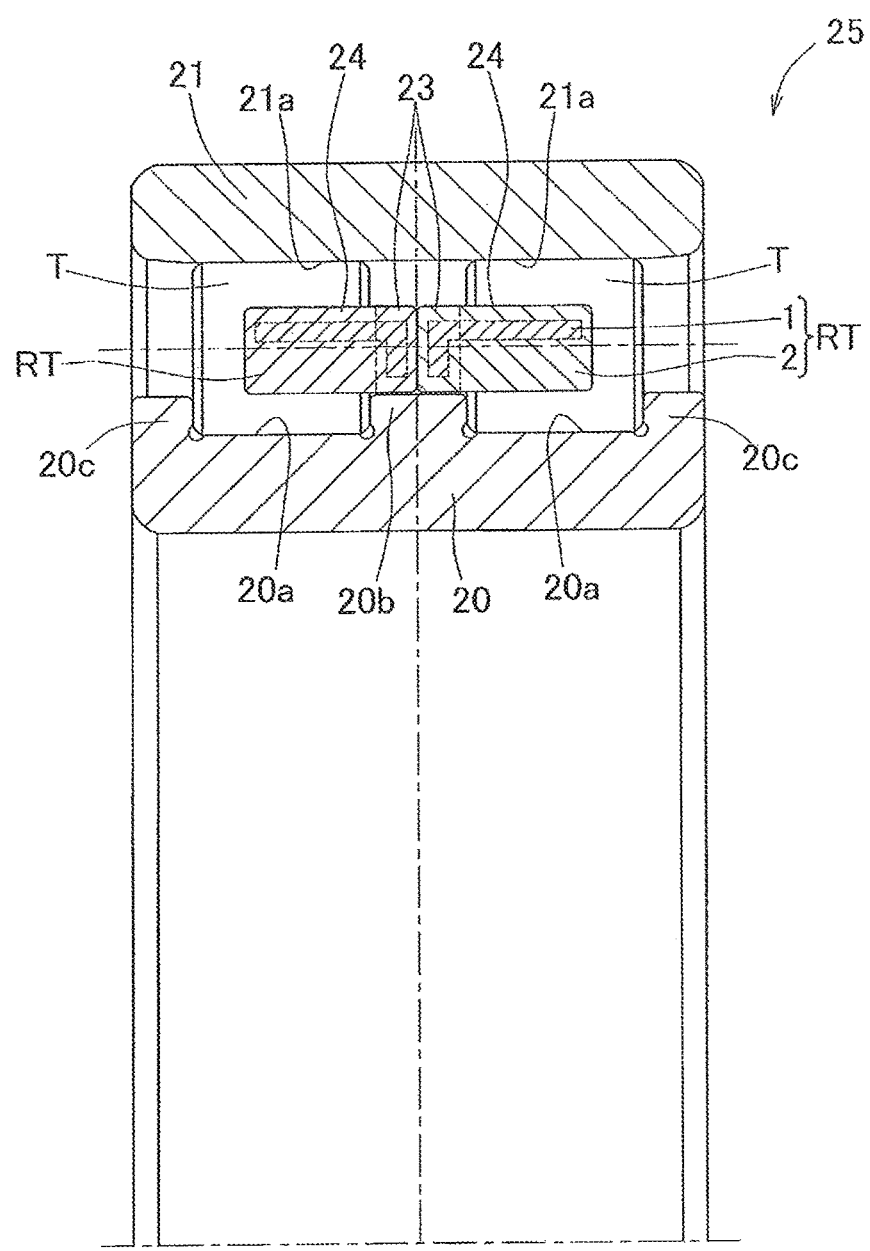
FIG. 12 is a sectional view showing the rolling bearing designed in accordance with a fifth preferred embodiment of the present invention.

As shown in FIG. 12, the rolling bearing 25 according to this preferred embodiment is a multi-row cylindrical roller bearing including an inner ring 20 having a plurality of rows of raceway surfaces 20a defined therein, an outer ring 21 having a single row of a raceway surface 21a, and cylindrical rollers which are a plurality of rolling elements T for each row interposed between the raceway surfaces 20a and the raceway surface 21a, and a pair of retainers RT, each of those retainers RT retaining a corresponding single row of the cylindrical rollers. The inner ring 20 is a collared ring having outer collars 20c on axially outer sides of each of the raceway surfaces 20a and intermediate collar 20b defined intermediate between the plurality of the raceway surfaces 20a. This inner ring 20 is mounted on, for example, an outer peripheral surface of a main shaft not shown. The outer ring is in the form of a collarless outer ring and is mounted on, for example, an inner peripheral surface of a housing not shown. Each of the inner ring 20, the outer ring 21 and the rolling elements T are made of, for example, a bearing steel. This rolling bearing 25 is used with a lubricant such as, for example, oil or grease filled within an inner space. Also, this rolling bearing 25 is so designed that, in order to enhance the radial rigidity of the bearing, a radial inner gap after set-in a device is set to minus.

Figure 13A:
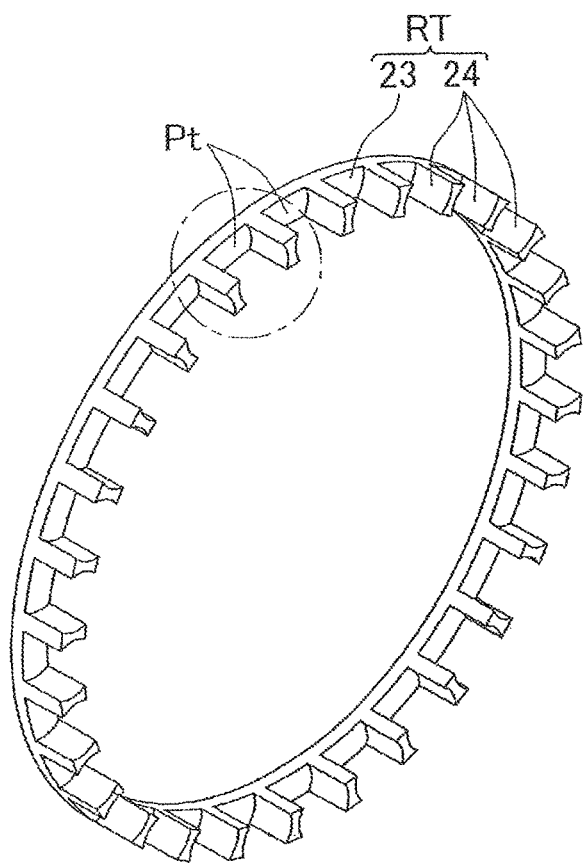
FIG. 13A is a perspective view showing the retainer for the rolling bearing.

As shown in FIG. 13A, the retainer RI is of a comb shape including a ring shaped body 23 and a plurality of support column bodies 24 protruding axially from a plurality of circumferential locations of the ring shaped body 23 and retains cylindrical rollers one within each pocket Pt defined between the neighboring support column bodies. The support column bodies 24 are arranged having been circumferentially spaced an equal distance from each other.

Figure 13B:
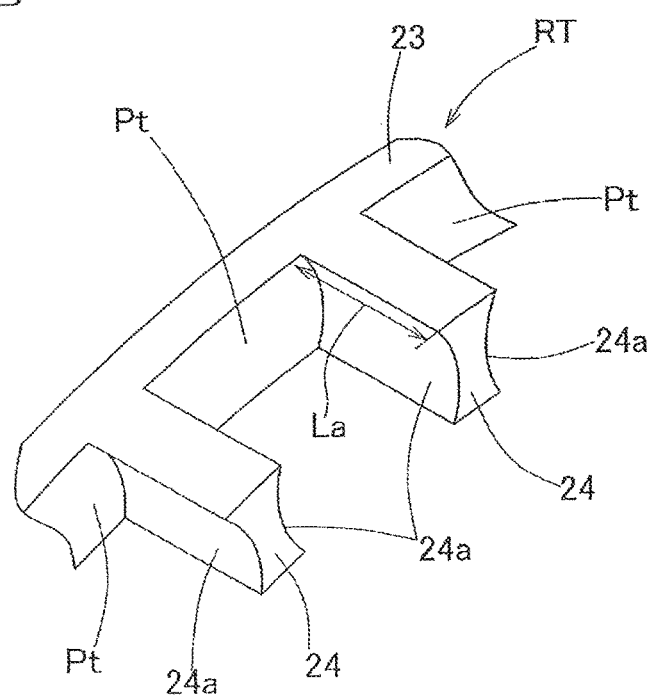
FIG. 13B is a perspective view showing, on an enlarged scale, a portion of the retainer.

FIG. 13B illustrates a perspective view showing, on an enlarged scale, a portion of the retainer RT, that is, a portion encompassed by the single dotted circle in FIG. 13A. As shown in FIG. 13B, the retainer RI has defined therein the pockets Pt each opening in one of opposite axial directions and also has defined therein the support column bodies 24 each having the axial length La set to a value smaller than the axial length of each of the cylindrical rollers.

Figure 14:
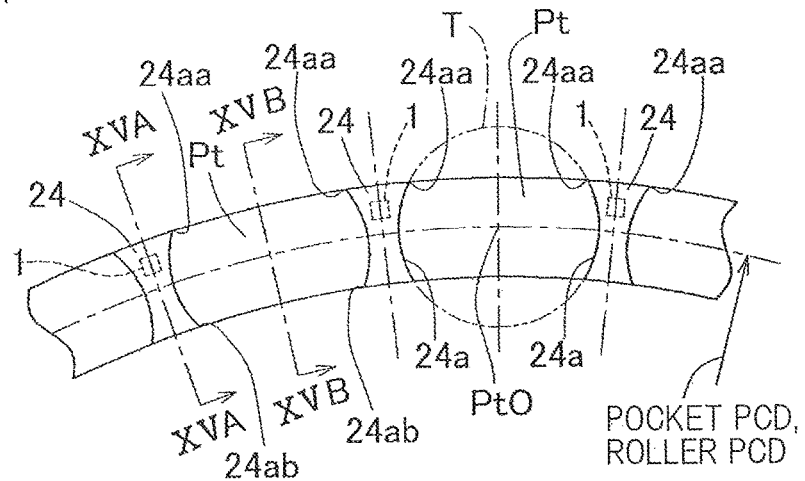
FIG. 14 is a side view showing a portion of the retainer as viewed from an axial tip end side of support column bodies.

FIG. 14 is a side view showing a portion of the retainer RT as viewed from an axial tip end side of one of the support column bodies 24. As shown in FIG. 14, the retainer RT is of a so-called rolling element guiding system that is guided by the rolling elements T. This retainer RI is of such a design that a pocket PCD which is a diameter of a pitch circle passing through respective pocket centers PtO is equal to a roller PCD which is a diameter of a pitch circle passing through respective cylindrical roller centers. In this retainer RI, respective side faces 24a and 24a of the circumferentially opposed support column bodies 24 and 24 have arcuate faces depicted about the center represented by the pocket center PtO. In the side faces 24a and 24a of the respective support column bodies 24 and 24 that are opposed circumferentially to each other, the distance from an outer peripheral edge 24aa of one of the side faces 24a to an outer peripheral edge 24aa of the other of the side faces 24a is stipulated to be smaller by a predetermined length than the diameter of each of the cylindrical rollers. Also, in those side faces 24a and 24a of the support column bodies 24 and 24, even the distance from an inner peripheral edge 24ab of one of the side faces 24a to an inner peripheral edge 24ab of the other of the side faces 24a is stipulated to be smaller by a predetermined length than the diameter of each of the cylindrical rollers.

Figure 15A:
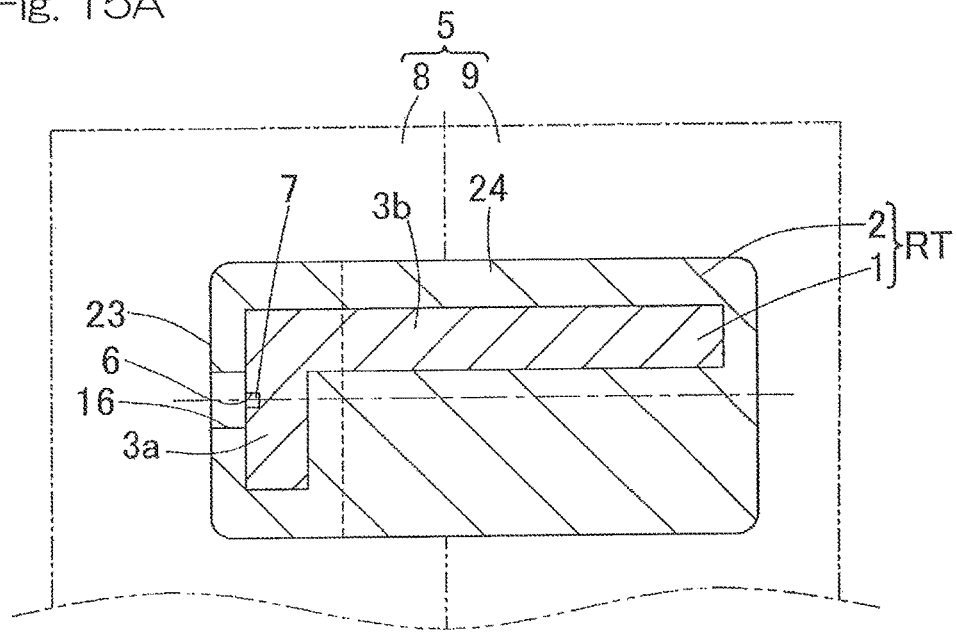
FIG. 15A is a sectional view showing the retainer as cut in the support column body.
Figure 15B:
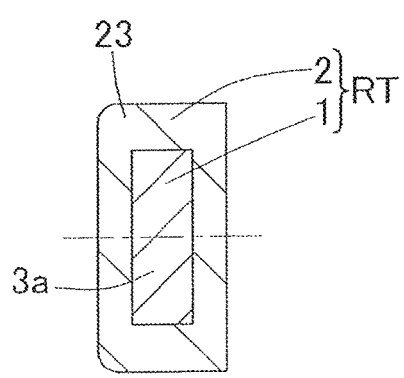
FIG. 15B is a sectional view showing the retainer as cut in a pocket.

FIG. 15A is a sectional view of the retainer RT as cut along the support column body 24 (corresponding to the cross sectional view taken along the line XVA-XVA in FIG. 14) and FIG. 15B is a sectional view of the retainer RT as cut along the pocket Pt (corresponding to the cross sectional view taken along the line XVB-XVB in FIG. 14). As shown in FIGS. 15A and 15B, this retainer RT includes an ring shaped core member 1 made of a metallic material such as, for example, a cold rolled steel plate, and a resin part 2 made of a resinous material and enclosing the core member 1. In the retainer RT now under discussion, the core member 1 which has been processed by a machine work such as, for example, a press work, is used. The retainer RI is made by setting the core member 1, which has been processed by the machine work, in a mold 5 of the injection molding machine, then molding the resinous material by means of an injection molding mold as it is, and finally integrating the core member 1 and the resin part 2 together. An outer side surface of the ring shaped body embedded part 3a of the core member 1 is provided with a plurality of support areas 6 which are supported having been engaged with the support projections 7 in the mold 5, which support areas are circumferentially spaced an equal distance from each other. Also, the resin part 2 is provided with support area exposure parts 16, through which the support areas 6 are exposed, at a plurality of circumferential locations corresponding to the support areas 6. It is to be noted that material for the core member 1 is not necessarily limited to the cold rolled steel plate.

The core member in its entirety is embedded within the resin part 2. As a material suitable for the resin part 2, a resinous material having a Young's modulus not higher than 9 GPa, such as, for example, polyamide resin (PA66, PA46, PA 6) can be used. It is however to be noted that the resinous material used for the resin part 2 is not necessarily limited to the polyamide resin. The resin part 2 includes a ring shaped body 23 and a plurality of support column bodies 24. As shown in FIG. 13B, the plurality of the support column bodies 24 extends in one axial direction from the ring shaped body 23 and pockets Pt for retaining the cylindrical rollers are formed each between the neighboring support column bodies 24.

Figure 16:
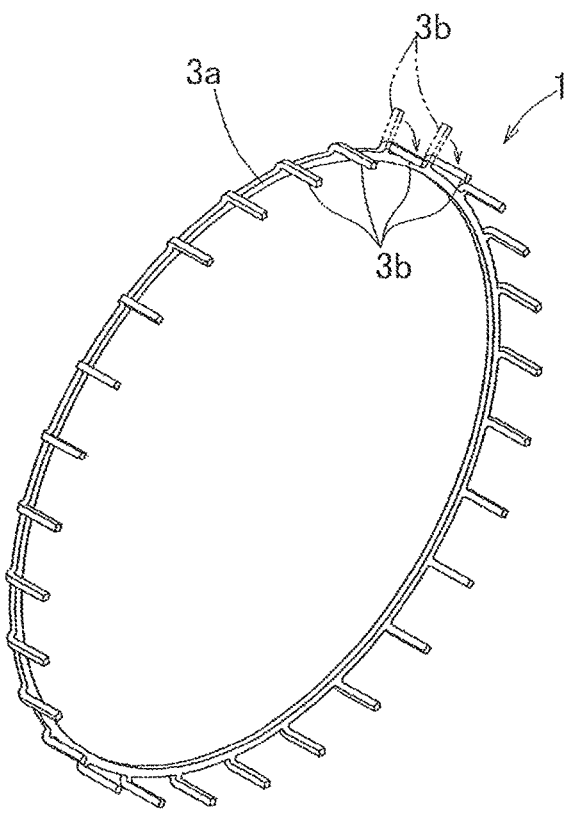
FIG. 16 is a perspective view of the core member in the retainer.

As shown in FIG. 16, the core member 1 is made up of an ring shaped body embedded part 3a, which is embedded in the ring shaped body 23 (best shown in FIG. 15A) of the resin part 2, and support column body embedded parts 3b embedded in the respective support column body embedded parts 3b while extending in the axial direction from the ring shaped body embedded part 3b. Those support column body embedded parts 3b are disposed having been circumferentially spaced an equal distance from each other. Each of the support column body embedded parts 3b is in the form of a bent piece formed by applying a bending work to a base end relative to the ring shaped body embedded part 3a. More specifically, by performing a process of blanking applied to a metallic plate or a thin plate-like shape, the support column body embedded part 3b is so formed as to extend in a radially outward direction from an outer peripheral edge of the ring shaped body embedded part 3a (as shown by the single dotted line in FIG. 16). Subsequently, the plurality of support column body embedded parts 3b is bent (as shown by the solid line in FIG. 16).

The cylindrical roller will hereinafter be discussed.

Figure 17:
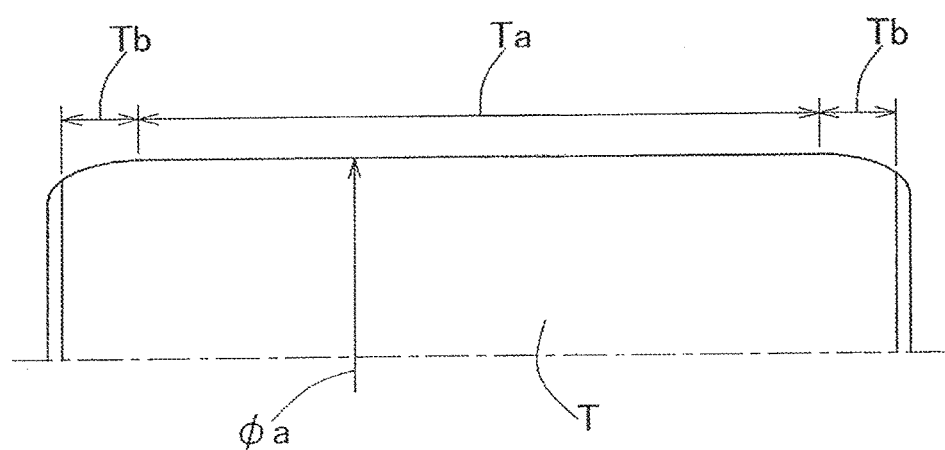
FIG. 17 is a front elevational view schematically showing one of rolling elements of the rolling bearing.

FIG. 17 illustrates a front elevational view, with a lower portion removed, schematically showing one of the rolling elements T of the rolling bearing 25. As shown in FIG. 17, a rolling surface of each of the cylindrical rollers is made up of a cylindrical surface Ta, formed in an axially intermediate portion, and a crowning Tb formed at opposite axial ends in continuation with the cylindrical surface Ta. It is, however, to be noted that the case may occur in which no crowning Tb is provided. This rolling bearing 25 is such that the mutual error of a diameter of the cylindrical roller (a rolling element diameter $\phi$ a) is so chosen as to be not greater than 2 µm. The term "mutual error of a rolling element diameter $\phi$ a" referred to hereinbefore and hereinafter is to be understood as meaning the difference between the maximum value and the minimum value of the average rolling element diameters of the plurality of the rolling elements T provided in a single rolling bearing. The term "average rolling element diameter" referred to above means a value obtained by averaging the values which have been obtained as a result of a number of measurements of the cylindrical surface Ta of the single cylindrical roller.

Also, in this rolling bearing the circularity of each of the cylindrical rollers is chosen to be not greater than 1 µm. That is because unless the circularity of each of the cylindrical rollers is set to a value not greater than 1 µm, the rotational performance may be adversely affected.

Functions and effects of the present invention will be hereinafter discussed.

The retainer RT includes the ring shaped core member 1 and the resin part 2 enclosing the core member 1. The use of the core member 1 extraordinarily high in Young's modulus as compared with the resin makes it possible to use a relatively inexpensive resinous material, not such relatively expensive materials as, for example, PEEK and PPS and, yet, the retainer rigidity comparable or higher than that exhibited by the use of, for example, PEEK can be obtained. It is to be noted that, although the relatively inexpensive resinous material is not specifically defined publicly, the resinous material having the Young's modulus not higher than 9 GPa, such as, for example, polyamide resin (PA66, PA46, PA6) falls within the inexpensive category. In contrast thereto, the resinous material having the Young's modulus exceeding 9 GPa, such as, for example, PEEK or PPS appears to be more expensive than the resinous material having the Young's modulus not higher than 9 GPa.

Although it may generally be considered that complexation of the resin and the metallic body will result in increase of the cost, an attempt to increase the retainer rigidity with the use of only the resin does not often lead to become successful unless the expensive resinous material is selected. However, if only the use of the relatively inexpensive material for the core member, such as, for example, the cold rolled steel plate, in combination with the resinous material as hereinabove described as employed in the practice of the various preferred embodiments of the present invention, will not necessarily leads to the increase of the cost so much as the retainer made of only the expensive resinous material, when considering comprehensively.

With the retainer rigidity so increased as hereinabove discussed, even though the mutual error of the rolling element diameter $\phi$ is not greater than 2 µm, particularly, not smaller than 1 µm but not greater than 2 µm, any value of the mutual error in this range is greater than that of the conventional art, lead-lag of the cylindrical rollers can be finely corrected. Accordingly, since when the cylindrical roller is to be manufactured, the productivity increases in terms of the processing, the cost of manufacture can be reduced much more than the conventional technique. The retainer RT designed according to any of the preferred embodiments of the present invention can work satisfactory when used particularly in the application at a preload gap (in which the radial internal gap is a minus value) and the lead-lag can be finely corrected by increasing the retainer rigidity, but even where the radial inner gap is a positive gap, the increase of the retainer rigidity is effective to allow the lead-lag of the cylindrical rollers to be finely corrected within a load range.

Also, by increasing the retainer rigidity, reduction of the bending strength applied to the retainer RT can be accomplished. Accordingly, the circumferential thickness of the support column body 24 in the retainer RT can be reduced and, hence, the number of the rollers that can be accommodated by the retainer RT can be increased to a value greater than that in the conventional retainer. Accordingly, the radial rigidity of the bearing can also be increased.

When the plurality of the support column body embedded parts 3b in the core member 1 is so shaped as to extend axially while having been continued from the ring shaped body embedded part 3a of a ring shape, the rigidity of the ring shaped body embedded part 3a can be increased and, also, the rigidity of the support column body embedded parts 3b having formed therein the pockets Pt for guiding outer diametric surfaces of the cylindrical rollers can be increased. In view of this, for a given number of the rollers, the strength of the support column bodies 24 used in the retainer RT can be increased.

The provision of the core member 1, made of the metallic material, within the resin part 2 is particularly advantageous enough to make it less sensitive to influences brought about by shrinkage during the molding and the retainer RT can be highly accurately formed as compared with the ordinary retainer made of only a resinous material having no core member embedded therein. As a result thereof, the necessity of increasing pocket gaps and guide gaps in the retainer RT is eliminated and, hence, the amount of run-out or the retainer can be reduced as compared with that exhibited by the conventional retainer. In view of this, not only can the vibration resulting from run-out of the retainer be reduced, but also the level of an acoustic value can be reduced.

Since the resinous material having the Young's modulus not higher than 9 GPa such as, for example, polyamide resin (PA66, PA46, PA6) can be used as the material for the resin part 2, the cost of material can be reduced to a value smaller than that of the resinous material such as, for example, PEEK or PPS. It is to be noted that particularly in the special application in which the bearing is used at an ultrahigh speed, such resinous materials as, for example, PEEK and PPS may be used as a material for the resin part 2. In such case, the retainer rigidity increases as compared with that in the previously described fifth embodiment of the present invention and it can withstand against the centrifugal force applied to the retainer RT during the high speed rotation.

Figure 18:
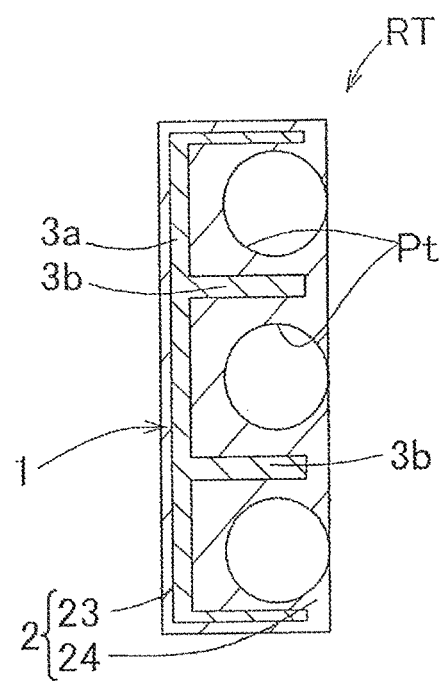
FIG. 18 is a sectional view showing the retainer for the rolling bearing designed in accordance with a sixth preferred embodiment of the present invention.

As is shown in FIG. 18 in connection with a sixth preferred embodiment of the present invention, the retainer RT of the present invention may be applied to a crown shaped ball bearing retainer. If as is the case with the retainer according to any of the previously described embodiments, even this ball bearing retainer, when provided by embedding the core member 1 within the resin part 2, can make use of the inexpensive resinous material lower than, for example, PEEK and, yet, the retainer rigidity equal to or higher than that of PEEK can be obtained. With the retainer rigidity so increased, the lead-lag of balls can be finely corrected even with the mutual error of the rolling element diameter set to a value not greater than 2 μm. Also, with the retainer rigidity so increased, the bending strength applied to the retainer RT can be reduced. Accordingly, the circumferential thickness of the support column body in the retainer RT can be reduced and, therefore, the number of the ball accommodated by the retainer RT can be increased to a value greater than those in the conventional crown shaped ball bearing retainer. For this reason, the radial rigidity of the bearing can also be increased. In an angular contact ball bearing that is one of the ball bearings which is often used with a preload applied thereto in a manner similar to that according to the previously described fifth embodiment, by applying the crown shaped retainer having the increased retainer rigidity, the lead-lag of the rolling elements can be further finely corrected. With respect to the others, functions and effects similar to those afforded by the previously described fifth embodiment can be obtained.

Although in describing the rolling bearing reference has been made to the cylindrical roller bearing or the ball bearing, the present invention may be equally applied to any of a tapered roller bearing and a needle roller bearing. Even in those cases similar functions and effects can be obtained.

At least one of the inner ring 20, the outer ring 21 and the plurality of rolling elements T may be made of a ceramic material. Where the bearing is used at an ultra-high speed, it is quite often that the inner ring 20, the outer ring 21 and/or the rolling elements T are/is made of the ceramic material. Even in such case, by applying the crown shaped retainer in which the core member 1 is embedded within the resin part 2, the retainer rigidity can be increased.

Figure 19:
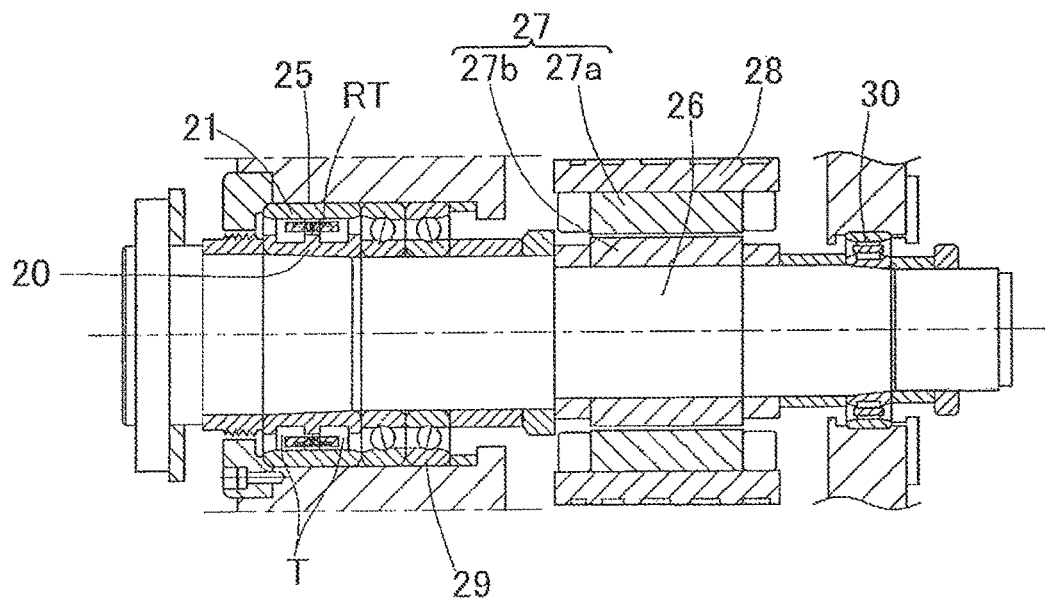
FIG. 19 is a sectional view schematically showing an example in which the rolling bearing according to any one of the preferred embodiments of the present invention is provided in a machine tool.
Figure 20:
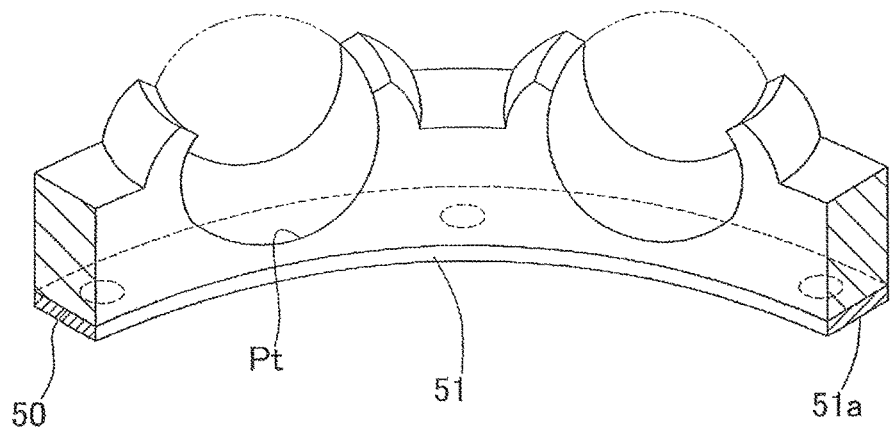
FIG. 20 is a perspective view showing the rolling bearing retainer according to the conventional art.
Figure 21:
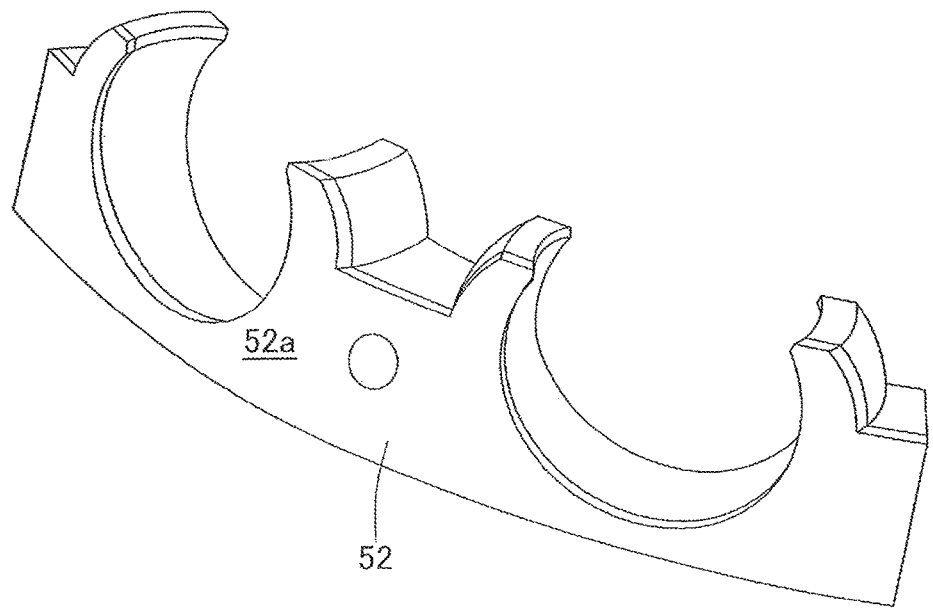
FIG. 21 is a perspective view showing the rolling bearing retainer according to the different conventional art.

FIG. 19 illustrates a sectional view schematically showing one example in which the rolling bearing designed in accordance with any one of the previously described preferred embodiments of the present invention is applied to a machine tool. In the example shown in FIG. 19, the multi-row cylindrical roller bearing 25 according to this embodiment of the present invention is incorporated in a main shaft 26 of a lathe of a built-in motor drive type. In this example, a drive motor 27 is incorporated within a device. The motor 27 referred to above includes a stator 27a, which is fixedly mounted on an axial intermediate part of a housing 28, and a rotor 27b fixedly mounted on an outer peripheral surface of the main shaft 26. The multi-row cylindrical roller bearing 25 and a multi-row angular contact ball bearing 29 are mounted on axial tip end portions of the housing 28, and a cylindrical roller bearing 30 is mounted on an axial base end portion of the housing 28. By those bearings 25, 29 and 30, the main shaft 26 is rotatably supported and this main shaft 26 is rotationally driven by the motor 27.

When the rolling bearing 25 according to this embodiment of the present invention is provided in the main shaft 26 of such a machine tool as described above, not only the rigidity of the retainer RT is increased to the extent equal to or higher than a high level resin made product, but also the lead-lag of the rolling elements T can be removed, and, therefore, a higher speed rotation can be accomplished, not only the vibration induced by the run-out of the retainer RT is reduced, but also the level of the acoustic value can be reduced. In addition, with the manufacturing cost of the rolling bearing 25 reduced, the cost of the machine is reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Core member
2 . . . Resin part
3 . . . Core member split body
3a . . . Ring shaped body embedded part
3b . . . Support column body embedded part
5 . . . Mold
6 . . . Support area
7 . . . Support projection
8 . . . Stationary mold
9 . . . Movable mold
14 . . . Cavity
16 . . . Support area exposure part
20 . . . Inner ring
21 . . . Outer ring
23 . . . Ring shaped body
24 . . . Support column body
Pt . . . Pocket RT . . . Retainer T . . . Rolling element

What is claimed is:

1. A rolling bearing retainer which is formed by insert molding a resinous material together with a core member with the use of a mold, and in which the core member is embedded within a resin part made of the resinous material and there is provided a support area exposure part at a plurality of locations of the resin part for exposing a support area of the core member supported within a cavity of the mold, wherein the resin part includes a ring shaped body and a plurality of support column bodies extending axially from the ring shaped body and defining a pocket for retaining a rolling element therebetween, and the core member includes a ring shaped body embedded part embedded in the ring shaped body of the resin part and a plurality of support column body embedded parts extending axially from the ring shaped body embedded part and embedded in the respective support column bodies.

2. The rolling bearing retainer as claimed in claim 1, in which the core member is a press worked product of a metallic plate.

3. The rolling bearing retainer as claimed in claim 1, in which each of the support column body embedded parts is in the form of a bent piece bend at a base end relative to the ring shaped body embedded part.

4. The rolling bearing retainer as claimed in claim 1, in which the support area of the core member is in the form of a recess formed in an axial outer surface on one side of the ring shaped body embedded part, in which the support column body embedded part does not protrude.

5. The rolling bearing retainer as claimed in claim 1, in which the rolling bearing retainer is formed as a ladder shaped type by means of a pair of the ring shaped bodies, which confront with each other while axially spaced from each other, and a plurality of the support column bodies that respectively connect the pair of the ring shaped bodies.

6. The rolling bearing retainer as claimed in claim 5, in which a pair of core member split bodies are opposed axially to each other to form the core member, and each of those core member split bodies includes the ring shaped body embedded part and the plurality of support column body embedded parts extending axially from the ring shaped body embedded part.

7. The rolling bearing retainer as claimed in claim 6, in which the pair of the core member split bodies are of the same shape and arranged to confront in respective directions opposite to each other.

8. The rolling bearing retainer as claimed in claim 1, in which the rolling bearing retainer is formed as a crown shaped type by means of a single ring shaped body and a plurality of the support column bodies extending axially from one side face of the ring shaped body and defining the round pocket for retaining a ball, which is the rolling element, therebetween.

9. The rolling bearing retainer as claimed in claim 1, in which the rolling bearing retainer is formed as a comb shaped type by means of a single ring shaped body and a plurality of the support column bodies extending axially from one side face of the ring shaped body and defining the pocket for retaining a roller, which is the rolling element, therebetween.

10. A rolling bearing utilizing the retainer as claimed in claim 1.

11. A rolling bearing which comprises a plurality of the rolling elements retained by the retainer as claimed in claim 1, in which the plurality of rolling elements are interposed between an inner ring and an outer ring, and a mutual error of a rolling element diameter is not greater than 2 µm for each of the plurality of rolling elements.

12. The rolling bearing as claimed in claim 11, in which the resinous material has a Young's modulus not higher than 9 GPa.

13. The rolling bearing as claimed in claim 11, in which at least one of the inner ring, the outer ring and the plurality of the rolling elements is made of a ceramic material.

14. The rolling bearing as claimed in claim 11, in which the circularity of the rolling element is not greater than 1 µm.

* * * * *